United States Patent
Ebara et al.

[11] Patent Number: 5,850,119
[45] Date of Patent: Dec. 15, 1998

[54] VIBRATION GYROSCOPE

[75] Inventors: Kazuhiro Ebara, Toyama; Katsumi Fujimoto, Toyama-ken; Hiroshi Nishiyama, Toyama, all of Japan

[73] Assignee: Murata Manufacturing Co. Ltd., Japan

[21] Appl. No.: 730,091

[22] Filed: Oct. 15, 1996

[30] Foreign Application Priority Data

Oct. 16, 1995 [JP] Japan ................................. 7-293397

[51] Int. Cl.⁶ .................................................. H01L 41/08
[52] U.S. Cl. ........................ 310/321; 310/316; 310/366; 310/367; 310/359; 73/514.34
[58] Field of Search .................................. 310/316, 317, 310/319, 358, 359, 366, 367–369; 73/504.12, 504.14, 514.34

[56] References Cited

U.S. PATENT DOCUMENTS

| | | | |
|---|---|---|---|
| 5,117,148 | 5/1992 | Nakamura et al. | 310/367 |
| 5,270,607 | 12/1993 | Terajima | 310/316 |
| 5,336,960 | 8/1994 | Shimizu et al. | 310/369 |
| 5,434,467 | 7/1995 | Abe et al. | 310/366 |
| 5,569,969 | 10/1996 | Kasanami et al. | 310/345 |
| 5,635,786 | 6/1997 | Fujimoto et al. | 310/316 |
| 5,635,787 | 6/1997 | Mori et al. | 310/316 |
| 5,648,608 | 7/1997 | Nakamura | 310/316 X |

*Primary Examiner*—Mark O. Budd
*Attorney, Agent, or Firm*—Ostrolenk, Faber, Gerb & Soffen, LLP

[57] ABSTRACT

A vibration gyroscope 10 includes a vibrator 12. The vibrator 12 has a vibration member 14 formed in a regular triangular prism shape and piezoelectric elements 16a, 16b and 16c. Two of the piezoelectric elements 16a and 16b are polarized in the direction from the outside to the vibration member 14, and the other piezoelectric element 16c is polarized in the direction from the vibration member 14 to the outside. An oscillation circuit 28 sends signals to the piezoelectric elements 16a to 16c and a signal output from the vibration member 14 is fed back. Two of the piezoelectric elements 16a and 16b are connected to a differential circuit 30. The differential circuit 30 is connected to a synchronous detection circuit 32 and then connected to a smoothing circuit 34 and a DC amplifier 36 in series.

21 Claims, 7 Drawing Sheets

VIBRATION GYROSCOPE

BACKGROUND OF THE INVENTION

1. Field of the Invention

The present invention relates to vibration gyroscopes, and more particularly, to a vibration gyroscope for detecting a rotation angular velocity with the use of bending and vibration of a vibration member.

2. Description of the Related Art

Figure 10:
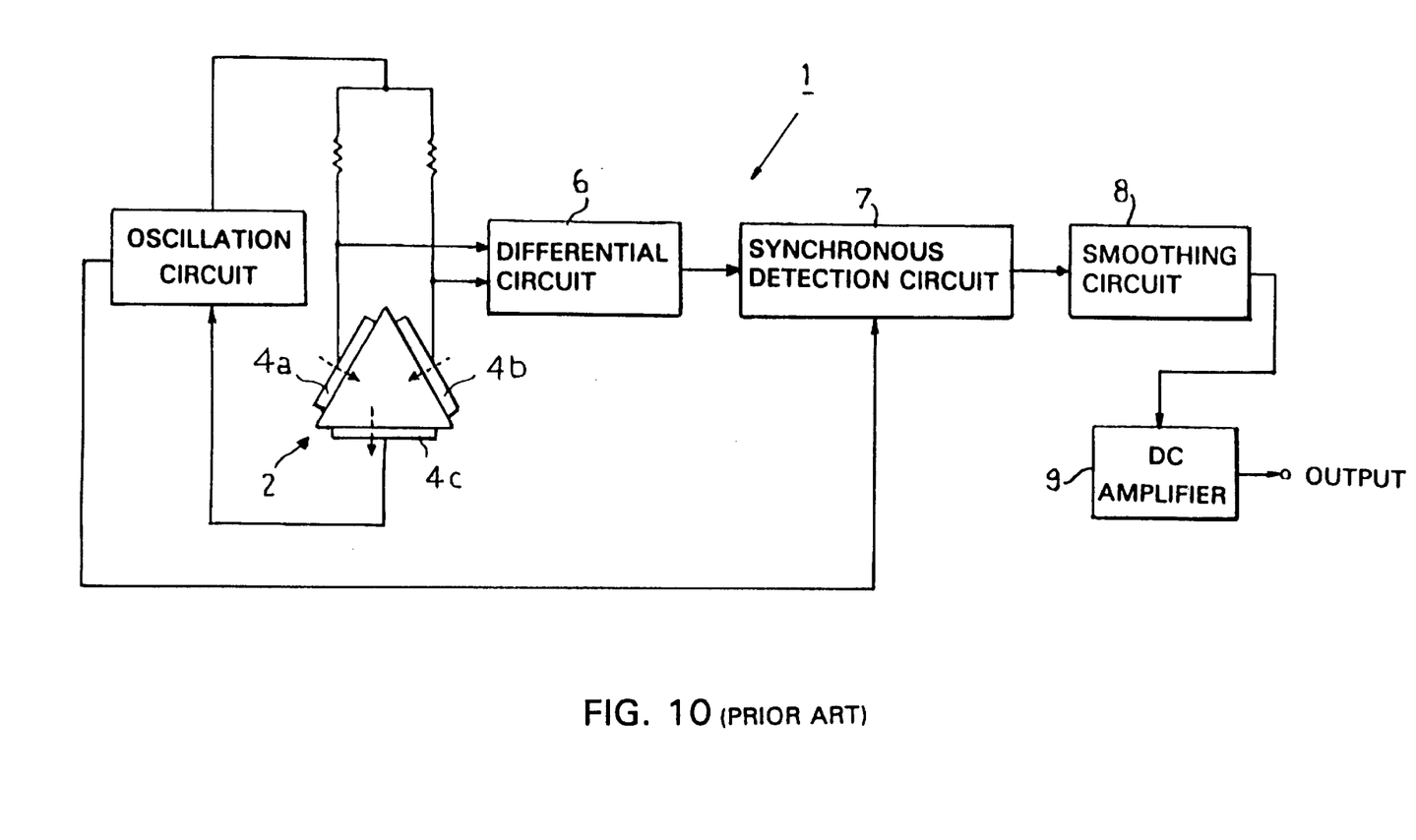
FIG. 10 is a diagram showing a conventional vibration gyroscope.

FIG. 10 is a diagram showing an example of a conventional vibration gyroscope. This vibration gyroscope 1 includes a vibrator 2. The vibrator 2 includes a vibration member 3 having, for example, a regular triangular prism shape. On the three side faces of the vibration member 3, three piezoelectric elements 4a, 4b, and 4c are formed, respectively. Polarization is applied to the piezoelectric elements 4a, 4b, and 4c in a direction from the outside of the piezoelectric elements 4a, 4b and 4c to the vibration member 3, for example, as shown by dotted lines in FIG. 10. The piezoelectric elements 4a and 4b are used for driving the vibrator 2 to bend and vibrate, and also for detection in order to obtain a signal corresponding to a rotation angular velocity. The piezoelectric element 4c is used in a feedback loop for driving the vibrator 2.

Between the piezoelectric elements 4a and 4b, and the piezoelectric element 4c, an oscillation circuit 5 is connected through resistors. The signals output from the piezoelectric elements 4a and 4b are input to a differential circuit 6. The signal output from the differential circuit 6 is detected by a synchronous detection circuit 7 in synchronization with the signal of the oscillation circuit 5. The signal output from the synchronous detection circuit 7 is smoothed by a smoothing circuit 8 and amplified by a DC amplifier 9.

The oscillation circuit 5 gives a driving signal to the piezoelectric elements 4a and 4b, and the signal output from the piezoelectric element 4c is fed back to the oscillation circuit 5. With this configuration, the piezoelectric elements 4a and 4b are strained and a driving force is given to the vibration member 3. The vibration member 3 is driven in a self-excitation manner and it bends and vibrates in a direction perpendicular to the surface where the piezoelectric element 4c is formed. When the vibration member 3 rotates about its axis in this condition, the direction of vibration of the vibration member 3 changes due to the Coriolis force. Therefore, the signals outputted from the piezoelectric elements 4a and 4b are different. A signal corresponding to a rotation angular velocity can be obtained by calculating the difference between the signals output from the piezoelectric elements 4a and 4b in the differential circuit 6. The signal output from the differential circuit 6 is detected by the synchronous detection circuit 7, smoothed by the smoothing circuit 8, and amplified by the DC amplifier 9. By measuring this signal, the rotation angular velocity applied to the vibration gyroscope 1 can be detected.

In such a vibration gyroscope, compactness and a low-voltage drive are demanded. When a low-voltage power supply such as a dry cell is used, sufficient excitation cannot be applied to a vibrator. If a vibrator is not sufficiently excited, the sensitivity of the vibration gyroscope decreases. As a countermeasure to this problem, a peripheral circuit has conventionally compensated for a decrease in sensitivity. When this countermeasure is used, vibrator noise and circuit noise are also amplified, and the S/N ratio is reduced.

SUMMARY OF THE INVENTION

Accordingly, it is an object of the present invention to provide a highly sensitive vibration gyroscope in which a vibration member can be sufficiently excited even with a low-voltage power supply.

The foregoing object is achieved in one aspect of the present invention through the provision of a vibration gyroscope comprising: a vibration member; a plurality of piezoelectric elements on the vibration member for vibrating the vibration member; a driving circuit for applying driving signals to each of the plurality of piezoelectric elements to vibrate the vibration member; and means for feeding back a signal from the vibration member to the driving unit.

The foregoing object is achieved in another aspect of the present invention through the provision of a vibration gyroscope comprising: a vibration member; and a plurality of piezoelectric elements on the vibration member for vibrating the vibration member, wherein at least one of the plurality of piezoelectric elements is polarized in a different direction than other of the piezoelectric elements.

When the vibration member is formed in a regular triangular prism shape in this vibration gyroscope, the plurality of piezoelectric elements are formed on the three side faces of the vibration member, respectively, and two of the plurality piezoelectric members and the other one of the plurality of piezoelectric members are polarized in different directions.

The foregoing object is achieved in another aspect of the present invention though the provision of a vibration gyroscope comprising: a vibration member formed of a piezoelectric material; a plurality of driving electrodes on the vibration member for vibrating the vibration member; and at least one common electrode on the vibration member, wherein the vibration member is polarized between the plurality of the driving electrodes and the common electrode such that the direction of polarization between at least one of the driving electrodes and the common electrode differs from the direction of polarization between other of the driving electrodes and the common electrode.

When the vibration member is formed in a cylindrical shape in this vibration gyroscope, the plurality of driving electrodes and a plurality of common electrodes are formed alternately along the outer circumferential direction of the vibration member, and the vibration member is polarized between the plurality of driving electrodes and the plurality of adjacent common electrodes such that the direction of polarization between at least one of the drivings electrodes and one of the common electrodes adjacent thereto differs from the directions of polarization between others of the driving electrodes and one of the common electrodes adjacent thereto.

When the vibration member is formed in a hollow, cylindrical shape in this vibration gyroscope, the plurality of electrodes are formed on the outer side face of the vibration member and the at least one common electrode is formed on the inner side face of the vibration member, and the vibration member is polarized between the plurality of driving electrodes and the at least one common electrode such that the direction of polarization between the at least one of the driving electrodes and the common electrode differs from the direction of polarization between other of the driving electrodes and the common electrode.

When piezoelectric elements are formed on a side face of a vibration member, if the piezoelectric elements are polarized in different directions against the vibration member, all the piezoelectric elements incur displacements with driving signals being applied to all of them, and a driving force is applied to the vibration member. When a vibration member is formed by a piezoelectric member, if the vibration member is polarized between driving electrodes and common electrodes in different directions against the driving electrodes, the vibration member between the driving electrodes and the common electrodes incurs displacements with driving signals being applied to all the driving electrodes, and a driving force is applied to the vibration member.

According to the present invention, since a driving force is applied to the vibration member by all of the piezoelectric elements or the vibration member between the driving electrodes and the common electrodes, a force for bending the vibration member is given from the surroundings of the vibration member. Therefore, the amplitude of bending and vibration of the vibration member becomes larger than in a conventional vibration gyroscope, and a rotation angular velocity can be detected with high sensitivity.

The above-described object, other objects, features, and advantages of the present invention will be further clarified by detailed descriptions in the description of the preferred embodiments which will be mentioned below by referring to the drawings.

DESCRIPTION OF THE PREFERRED EMBODIMENTS

Figure 1:
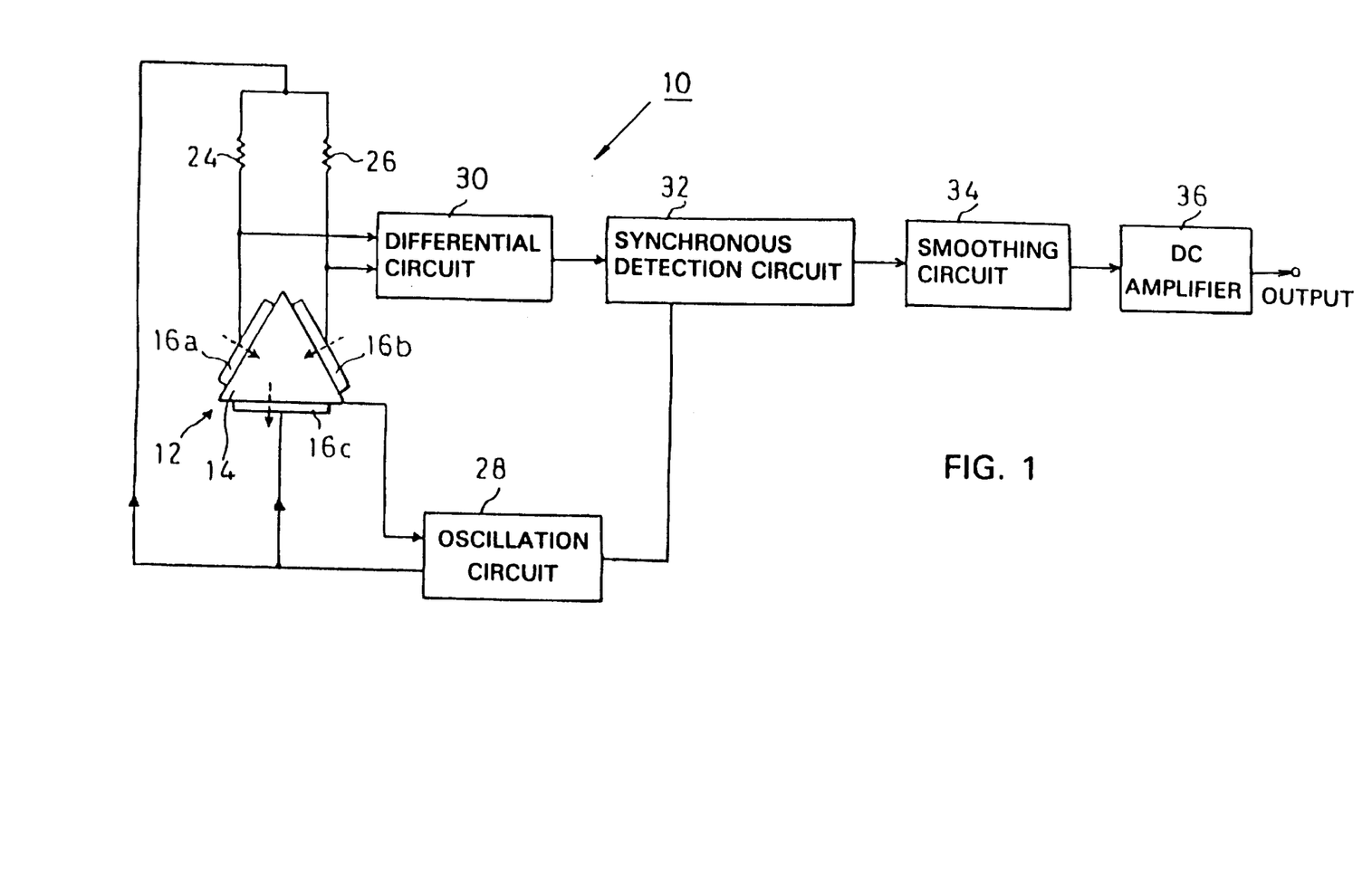
FIG. 1 is a diagram showing a vibration gyroscope of the present invention.
Figure 2:
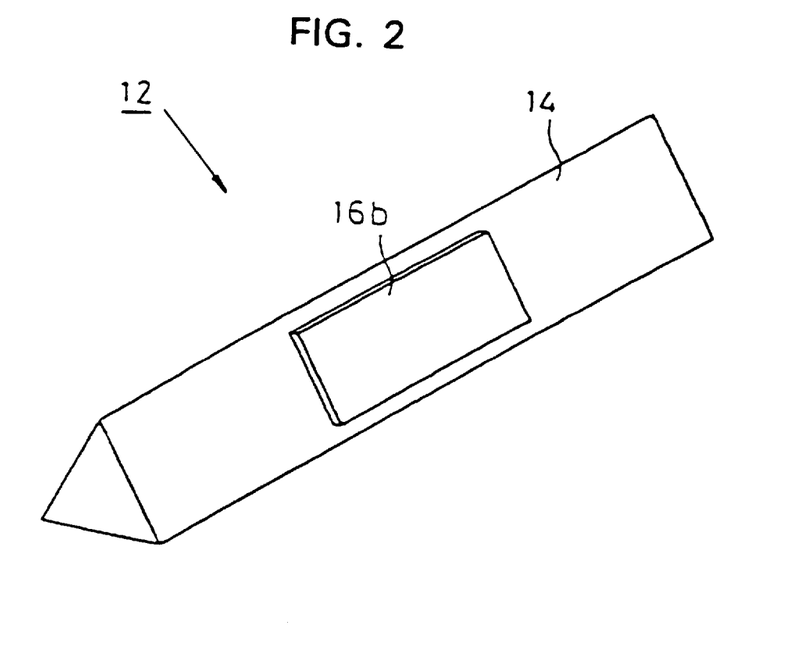
FIG. 2 is a perspective view of a vibrator used in the vibration gyroscope shown in FIG. 1.

FIG. 1 is a diagram showing an example of a vibration gyroscope 10 according to the present invention. The vibration gyroscope 10 includes a vibrator 12. The vibrator 12 has a vibration member 14 which is formed, for example, in a regular triangular prism shape, as shown in FIG. 2. The vibration member 14 is formed by materials generating mechanical vibration, such as elinvar, an iron-nickel alloy, quartz, glass, crystal, and ceramic.

Figure 3:
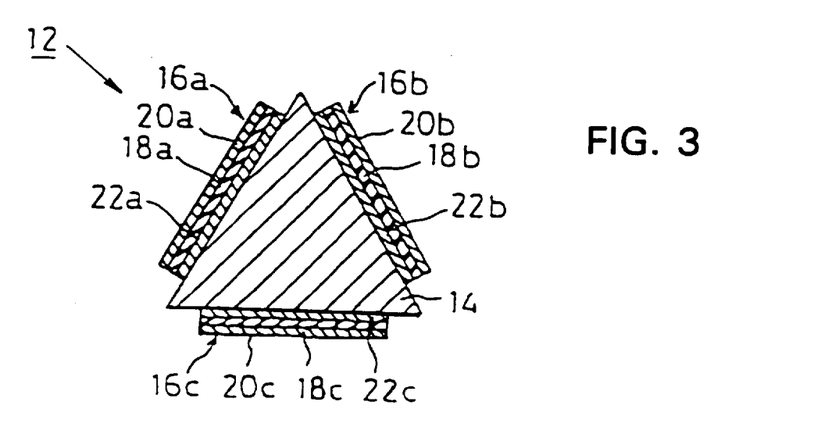
FIG. 3 is a cross section of the vibrator shown in FIG. 2.

On side faces of the vibration member 14, piezoelectric elements 16a, 16b, and 16c are formed. The piezoelectric element 16a includes a piezoelectric plate 18a formed by piezoelectric ceramic or the like, and electrodes 20a and 22a are formed on both surfaces of the piezoelectric plate, as shown in FIG. 3. The electrode 22a is stuck to the vibration member 14. In the same way, the piezoelectric elements 16b and 16c include piezoelectric plates 18b and 18c, and electrodes 20b and 22b, and 20c and 22c are formed on both surfaces of the piezoelectric plates. The electrodes 22b and 22c are stuck to the vibration member 14.

Polarization is applied in different directions against the vibration member 14 to the piezoelectric elements 16a and 16b, and to the piezoelectric element 16c. As shown in FIG. 1 by dotted lines, for example, when polarization is applied to the piezoelectric elements 16a and 16b in the direction from the outside of the piezoelectric elements 16a and 16b to the vibration member 14, polarization is applied to the piezoelectric element 16c in the direction from the vibration member 14 to the outside of the piezoelectric element 16c. The piezoelectric elements 16a to 16c are used for driving the vibration member 14 to bend and vibrate. The piezoelectric elements 16a and 16b are also used for detection in obtaining the signal corresponding to a rotation angular velocity.

The piezoelectric elements 16a and 16b are connected to resistors 24 and 26, respectively. Between these resistors 24 and 26 and the piezoelectric element 16c, and the vibration member 14, an oscillation circuit 28 is connected. The oscillation circuit 28 gives driving signals to the electrodes 20a, 20b, and 20c of the piezoelectric elements 16a, 16b, and 16c. The signals output from the electrodes 22a, 22b, and 22c of the piezoelectric elements 16a, 16b, and 16c are fed back to the oscillation circuit 28 through the vibration member 14.

The piezoelectric elements 16a and 16b are connected to the input terminals of a differential circuit 30. The output of the differential circuit 30 is connected to a synchronous detection circuit 32. The signal output from the differential circuit 30 is detected by the synchronous detection circuit 32 in synchronization with, for example, the signal from the oscillation circuit 28. The synchronous detection circuit 32 is connected to a smoothing circuit 34 and the smoothing circuit 34 is connected to a DC amplifier 36.

The oscillation circuit 28 sends signals to the piezoelectric elements 16a, 16b, and 16c, and a signal is fed back to the oscillation circuit from the vibration member 14 in this vibration gyroscope 10. The vibrator 12 is driven in a self-excitation manner and the vibration member 14 bends and vibrates in the direction perpendicular to the surface where the piezoelectric element 16c is formed. Since the piezoelectric elements 16a and 16b are polarized against the vibration member 14 in the direction opposite to that of the piezoelectric element 16c, when the same driving signal is applied, displacements appear in the opposite directions. In other words, when the piezoelectric elements 16a and 16b expand, the piezoelectric element 16c contracts. When the piezoelectric elements 16a and 16b contract, the piezoelectric element 16c expands. With such displacements in the piezoelectric elements 16a to 16c, the vibration member 14 bends and vibrates in the direction perpendicular to the surface where the piezoelectric element 16c is formed. In this case, the same signals are input to the differential circuit 30 from the piezoelectric elements 16a and 16b. Therefore, the differential circuit 30 does not output a signal and it is found that a rotation angular velocity is not applied.

When the vibration member 14 rotates about its axis in this condition, the direction of vibration of the vibration member 14 changes due to the Coriolis force. Therefore, the signals output from the piezoelectric elements 16a and 16b are different, and the difference is output from the differential circuit 30. The signal output from the differential circuit 30 is detected by the synchronous detection circuit 32 in synchronization with the signal of the oscillation circuit 28. The signal output from the synchronous detection circuit 32 is smoothed by the smoothing circuit 34 and amplified by the DC amplifier 36. The signal output from the DC amplifier 36 corresponds to a change in the direction in which the vibration member 14 vibrates, that is, corresponds to the Coriolis force. By measuring the signal output from the DC amplifier 36, the rotation angular velocity applied to the vibration gyroscope 10 can be detected.

In this vibration gyroscope 10, driving signals generate displacements in all of the piezoelectric elements 16a, 16b, and 16c, and the displacements work so as to bend the vibration member 14. In contrast, driving signals generate displacements only in two piezoelectric elements 4a and 4b in the conventional vibration gyroscope 1 shown in FIG. 10, and the piezoelectric element 4c serves as means for feeding back the signal caused by bending of the vibration member to the oscillation circuit. Therefore, the vibration gyroscope 10 according to the present invention has larger forces for driving the vibration member 14 than in the conventional vibration gyroscope, and the amplitude of vibration of the vibration member 14 can be made larger. The signals output from the piezoelectric elements 16a and 16b also become larger and a rotation angular velocity can be detected with high sensitivity.

Figure 4:
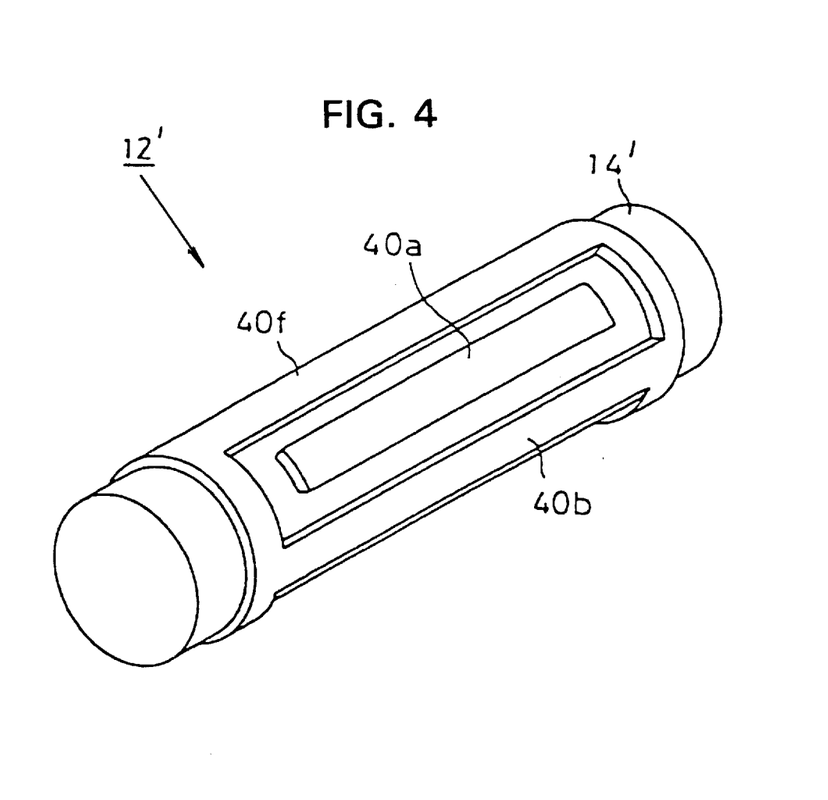
FIG. 4 is a perspective view of another vibrator used in a vibration gyroscope of the present invention.
Figure 5:
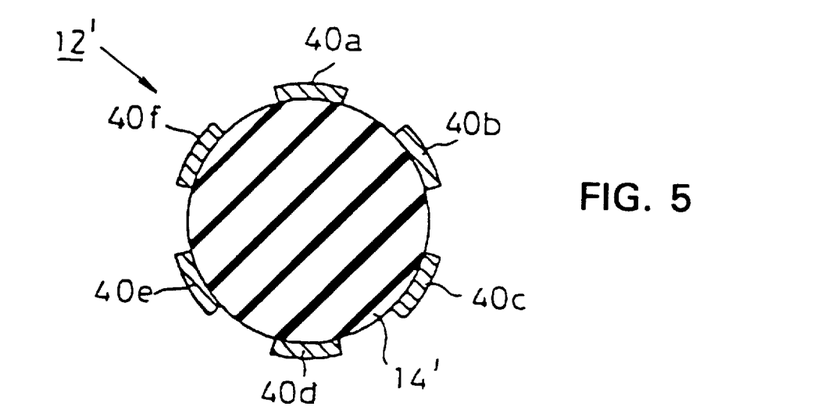
FIG. 5 is a cross section of the vibrator shown in FIG. 4.
Figure 6:
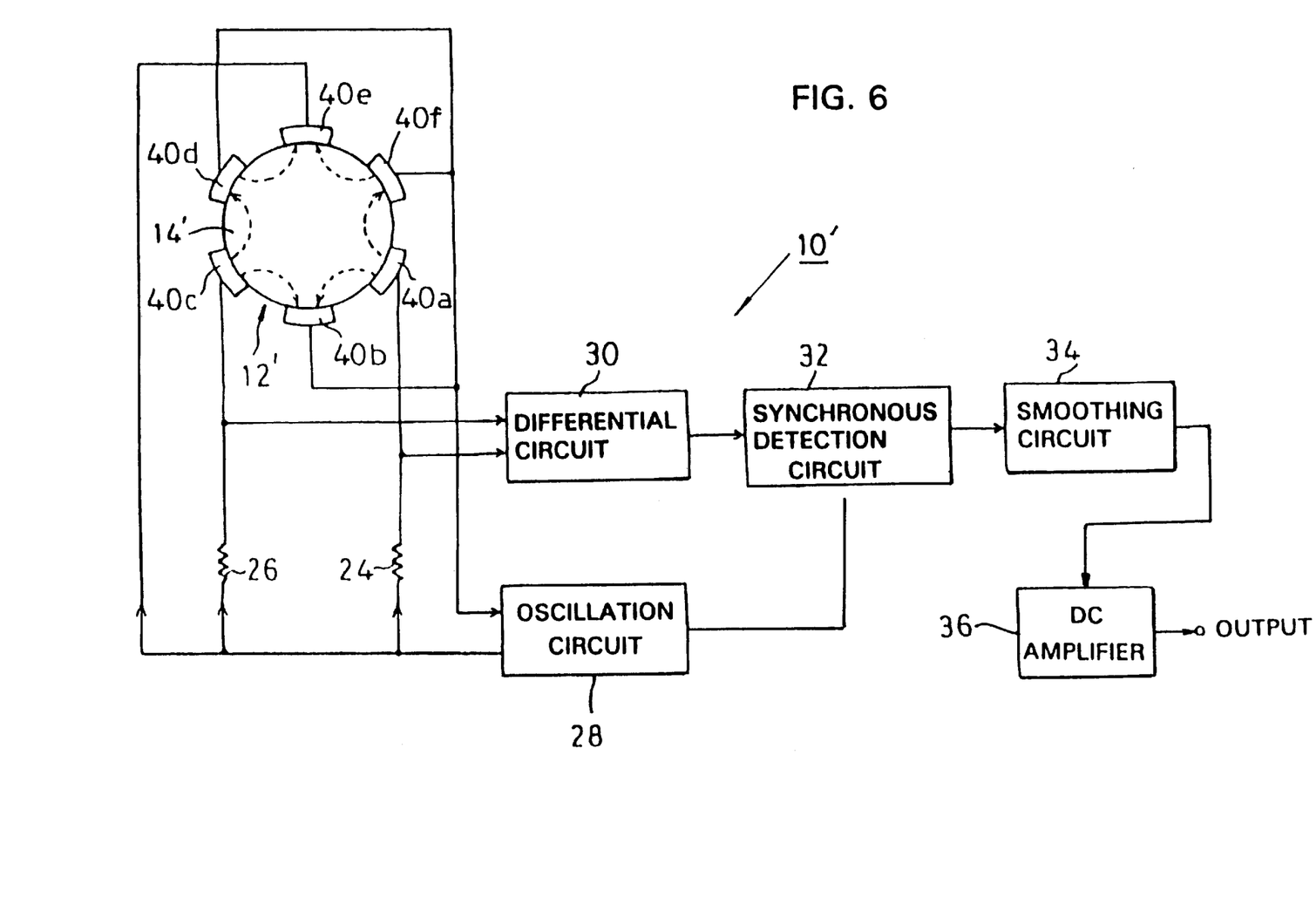
FIG. 6 is a diagram showing a vibration gyroscope using the vibrator shown in FIG. 4.

An alternative embodiment of a vibrator is shown in FIGS. 4 and 5 and an alternative embodiment of a vibration gyroscope using the vibrator of FIGS. 4 and 5 is shown in FIG. 6. Components of this embodiment which are the same as components in the first embodiment have the same reference numerals, while components which perform similar functions are designated by primed reference numerals.

Turning now to FIGS. 4 and 5, there is shown a vibrator 12' which uses a cylindrical vibration member 14'. The vibration member 14' is made up of a piezoelectric material. On the side face of the vibration member 14', six electrodes 40a, 40b, 40c, 40d, 40e, and 40f are formed. These electrodes 40a, to 40f are formed in the longitudinal direction of the vibration member 14'. The electrodes 40b, 40d, and 40f, which are disposed alternately on the side face, are connected at both ends and serve as common terminals. Electrodes 40a, 40c, and 40e are used for driving the vibration member 14' to bend and vibrate. Electrodes 40a and 40c are also used for detection in order to obtain the signal corresponding to a rotation angular velocity.

Polarization is applied to the vibration member 14' between driving electrodes 40a, 40c, and 40e and adjacent, common electrodes 40b, 40d, and 40f. As shown in FIG. 6 by dotted lines, polarization is applied to the vibration member 14' in the direction from the electrode 40a to the adjacent, common electrodes 40b and 40f. Polarization is also applied to the vibration member 14' in the direction from the electrode 40c to the adjacent, common electrodes 40b and 40d. Polarization is further applied to the vibration member 14' in the direction from the two common electrodes 40d and 40f to the electrode 40e.

In this vibrator 12', an oscillation circuit 28 sends driving signals to the driving electrodes 40a, 40c, and 40e, and the signal output from the common electrodes 40b, 40d, and 40f is fed back to the oscillation circuit 28. The two electrodes 40a, and 40c are connected to a differential circuit 30. Since the vibration member 14' is polarized in one direction for driving electrodes 40a and 40c, and in an opposite direction for driving electrode 40e, when the same driving signal is applied portions polarized in different directions incur opposite displacements. Then, the vibration member 14' bends and vibrates. Since driving forces are generated between all the driving electrodes 40a, 40c, and 40e and the common electrodes 40b, 40d, and 40f in the vibration gyroscope 10', a large amplitude can be obtained. Therefore, a rotation angular velocity can be obtained with high sensitivity even with the use of such a vibrator 12'.

Figure 7:
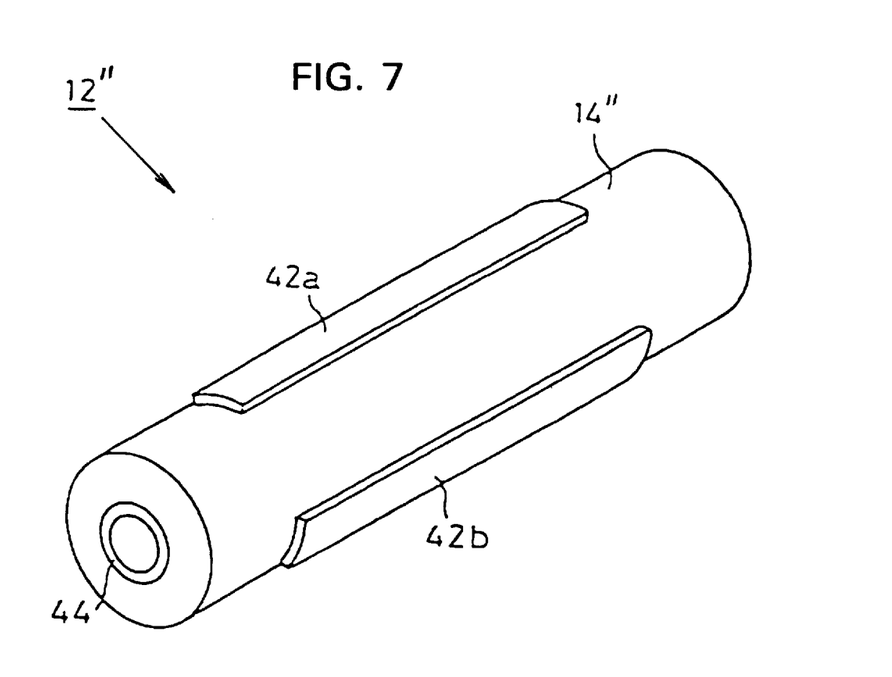
FIG. 7 is a diagram showing still another vibrator used in a vibration gyroscope of the present invention.
Figure 8:
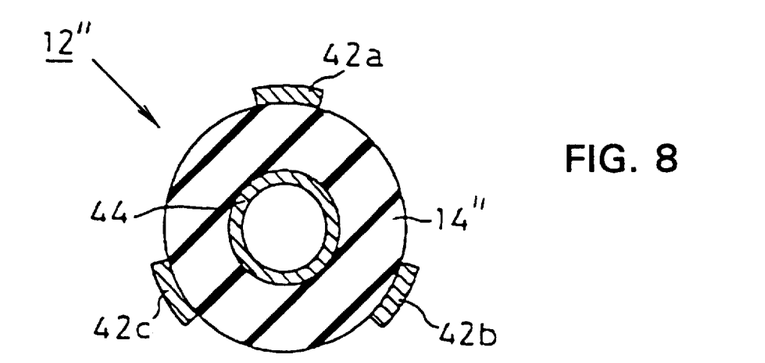
FIG. 8 is a cross section of the vibrator shown in FIG. 7.
Figure 9:
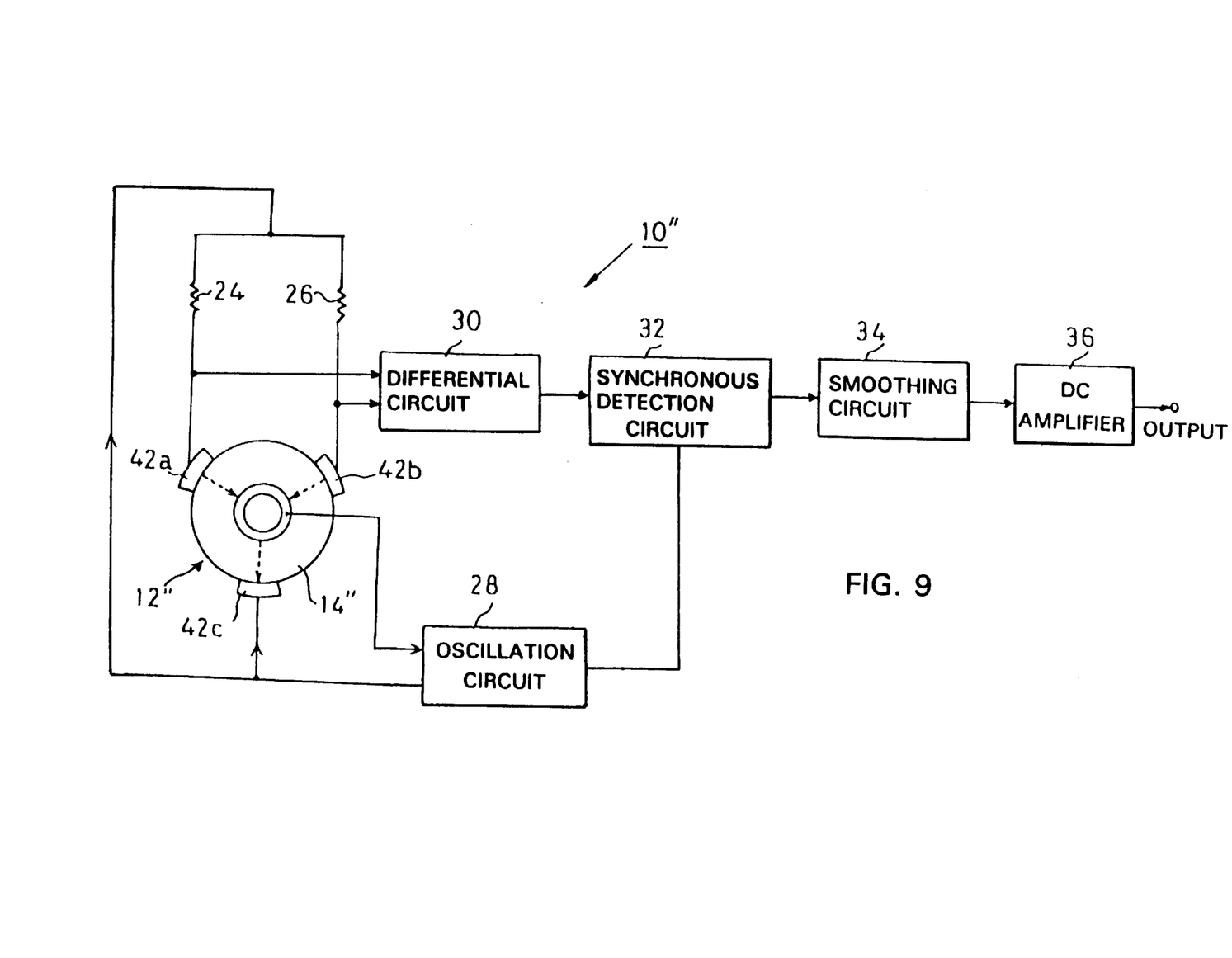
FIG. 9 is a diagram showing a vibration gyroscope using the vibrator shown in FIG. 7.

A further alternative embodiment of a vibrator is shown in FIGS. 7 and 8 and a further alternative embodiment of a vibrating gyroscope using the vibrator of FIGS. 7 and 8 is shown in FIG. 9. Components of this embodiment which are the same as components in the first and second embodiments have the same reference numerals, while components which perform similar functions are designated by double primed reference numerals.

Turning now to FIGS. 7 and 8, there is shown a vibrator 12" having a hollow, cylindrical vibration member 14" which is made of a piezoelectric material. On the outer side face of the vibration member 14", three driving electrodes 42a, 42b, and 42c are formed. On the inner side face of the vibration member 14, a common electrode 44 is formed. As shown in FIG. 9, polarization is applied to the vibration member 14 in directions from the driving electrodes 42a and 42b to the common electrode 44. Polarization is also applied to the vibration member 14 in the direction from the common electrode 44 to the driving electrode 42c.

When this vibrator 12" is used, an oscillation circuit 28 sends driving signals to the driving electrodes 42a, 42b, and 42c, and a signal output from the common electrode 44 is fed back to the oscillation circuit 28. Two electrodes 42a and 42b are connected to a differential circuit 30. Since the vibration member 14" is polarized in one direction for driving electrodes 42a and 42b, and in an opposite direction for driving electrode 42c, when the same driving signal is applied portions polarized in different directions incur opposite displacements. Then, the vibration member 14" bends and vibrates. Since driving forces are generated between all the driving electrodes 42a, 42b, and 42c and the common electrode 44 in the vibration gyroscope 10", a large amplitude can be obtained. Therefore, a rotation angular velocity can be obtained with high sensitivity even with the use of such a vibrator 12".

As described above, since the piezoelectric member of the vibrator 12 (or 12' or 12") is polarized in different directions, a large driving force is applied to the vibration member 14 (or 14' or 14"). Therefore, by applying the same driving signal to the piezoelectric elements of the vibrator 12 or the driving electrodes of the vibrator 12' or 12", a large amplitude is obtained and high sensitivity is acquired in detecting a rotation angular velocity.

The shape of the vibration member 14 (or 14' or 14") is not limited to a regular triangular prism shape, a cylindrical shape, and a hollow, cylindrical-cavity shape. It may be another shape such as a quadrangular-prism shape and a prism-cavity shape. By polarizing the piezoelectric members, i.e., the piezoelectric elements of the vibrator 12 and the vibration members of the vibrator 12' or 12", in different directions, bending and vibration having a large amplitude is obtained. When the amplitude of bending and vibration of the vibration member 14 (or 14' or 14") is made large, signals output from piezoelectric elements and electrodes which are used for detection become large and high sensitivity is acquired in detecting a rotation angular velocity.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A vibration gyroscope comprising:

a vibration member;

at least three piezoelectric elements on said vibration member for vibrating said vibration member;

a driving circuit for applying driving signals to each of said three piezoelectric elements to vibrate said vibration member; and means for feeding back a signal from said vibration member to said driving unit.

2. A vibration gyroscope according to claim 1, wherein each of said three piezoelectric elements is polarized, at least one of said three piezoelectric elements being polarized in a different direction than other of said piezoelectric elements with respect to directions extending between said piezoelectric elements and said vibration member.

3. A vibration gyroscope comprising:

a vibration member; and at least three polarized piezoelectric elements on said vibration member for vibrating said vibration member, wherein at least one of said three piezoelectric elements is polarized in a different direction than other of said piezoelectric elements with respect to directions extending between said piezoelectric elements and said vibration member.

4. A vibration gyroscope according to claim 3, wherein said vibration member is formed in a regular triangular prism shape having three side faces, said three piezoelectric elements includes first, second and third piezoelectric elements on the three side faces of said vibration member, respectively, and said first and second piezoelectric elements are polarized in the same direction and said third piezoelectric elements is polarized in a different direction.

5. A vibration gyroscope according to claim 4, further including a driving circuit for applying driving signals to each of said piezoelectric elements.

6. A vibration gyroscope according to claim 5, wherein said driving circuit comprises an oscillation circuit and wherein a signal from said vibration unit is fed back to said oscillation circuit.

7. A vibration gyroscope according to claim 6, wherein said first and second piezoelectric elements provide output signals and further including a differential circuit for detecting any difference between said output signals from said first and second piezoelectric elements.

8. A vibration gyroscope according to claim 7, further including a synchronous detection circuit connected to an output of said differential circuit; a smoothing circuit connected to an output of said synchronous detection circuit and an amplifier connected to an output of said smoothing circuit.

9. A vibration gyroscope according to claim 8, wherein an output of said oscillation circuit is connected to an input of said synchronous detection circuit.

10. A vibration gyroscope comprising:

a vibration member formed of a piezoelectric material and in a cylindrical shape;

at least three driving electrodes on said vibration member for vibrating said vibration member; and a plurality of common electrodes on said vibration member, said plurality of common electrodes and said three driving electrodes being formed alternately along the outer circumferential direction of said vibration member, wherein said vibration member is polarized between said three driving electrodes and said plurality of common electrodes such that the direction of polarization between at least one driving electrode and one of said plurality of common electrodes adjacent thereto differs from the directions of polarization between others of said driving electrodes and one of the common electrodes adjacent thereto with respect to directions extending between said driving electrodes and one of the common electrodes adjacent thereto.

11. A vibration gyroscope according to claim 10, further including a driving circuit for applying driving signals to each of said driving electrodes.

12. A vibration gyroscope according to claim 11, wherein said driving circuit comprises an oscillation circuit and wherein a signal from said vibration member is fed back to said oscillation circuit.

13. A vibration gyroscope according to claim 12, wherein first and second ones of said driving electrodes provide output signals and further including a differential circuit for detecting any difference between said output signals from said first and second driving electrodes.

14. A vibration gyroscope according to claim 13, further including a synchronous detection circuit connected to an output of said differential circuit; a smoothing circuit connected to an output of said synchronous detection circuit and an amplifier connected to an output of said smoothing circuit.

15. A vibration gyroscope according to claim 14, wherein an output of said oscillation circuit is connected to an input of said synchronous detection circuit.

16. A vibration gyroscope comprising:

a vibration member formed of a piezoelectric material and in hollow, cylindrical shape;

at least three driving electrodes formed on the outer side face of said vibration member, for vibrating said vibration member; and at least one common electrode formed on the inner side face of said vibration member, wherein said vibration member is polarized between said at least three driving electrodes and said common electrodes such that the direction of polarization between at least one driving electrode and said common electrode differs from the directions of polarization between others of said driving electrodes and said common electrodes with respect to directions extending between said driving electrodes and said common electrodes adjacent thereto.

17. A vibration gyroscope according to claim 16, further including a driving circuit for applying driving signals to each of said driving electrodes.

18. A vibration gyroscope according to claim 17, wherein said driving circuit comprises an oscillation circuit and wherein a signal from said vibration unit is fed back to said oscillation circuit.

19. A vibration gyroscope according to claim 18, wherein first and second ones of said driving electrodes provide output signals and further including a differential circuit for detecting any difference between said output signals from said first and second driving electrodes.

20. A vibration gyroscope according to claim 19, further including a synchronous detection circuit connected to an output of said differential circuit; a smoothing circuit connected to an output of said synchronous detection circuit and an amplifier connected to an output of said smoothing circuit.

21. A vibration gyroscope according to claim 20, wherein an output of said oscillation circuit is connected to an input of said synchronous detection circuit.

* * * * *